(12) United States Patent
Andersen et al.

(10) Patent No.: US 8,800,132 B2
(45) Date of Patent: Aug. 12, 2014

(54) MAGNET LOADING APPARATUS

(75) Inventors: Torben Peter Andersen, Taastrup (DK); Alan Hansen, Rødovre (DK); Stefan Maroti, Silkeborg (DK); Klaus Thaarup, Greve (DK)

(73) Assignee: Siemens Aktiengesellschaft, Munich (DE)

( * ) Notice: Subject to any disclaimer, the term of this patent is extended or adjusted under 35 U.S.C. 154(b) by 2 days.

(21) Appl. No.: 13/562,987

(22) Filed: Jul. 31, 2012

(65) Prior Publication Data

US 2013/0202399 A1 Aug. 8, 2013

(30) Foreign Application Priority Data

Aug. 1, 2011 (EP) .................................... 11176163

(51) Int. Cl.
*B21D 39/03* (2006.01)
*B23P 11/00* (2006.01)

(52) U.S. Cl.
USPC .................. 29/607; 29/759; 29/771; 29/787; 310/156.08

(58) Field of Classification Search
USPC ........ 29/602.1, 606, 607, 733, 771, 785, 809, 29/810, 430, 759, 281.5; 209/907; 310/156.08, 156.09, 156.11, 156.12
See application file for complete search history.

(56) References Cited

U.S. PATENT DOCUMENTS

| | | | | |
|---|---|---|---|---|
| 2,494,349 A * | 1/1950 | Mittermaier | ..................... | 29/609 |
| 4,144,637 A * | 3/1979 | Ioffe et al. | ........................ | 29/739 |
| 4,850,100 A * | 7/1989 | Stokes | ............................ | 29/596 |
| 6,449,832 B1 * | 9/2002 | Kawamura | ....................... | 29/771 |
| 6,452,301 B1 * | 9/2002 | Van Dine et al. | ......... | 310/156.12 |
| 7,545,067 B2 * | 6/2009 | Drexlmaier | .............. | 310/156.13 |
| 8,138,650 B2 * | 3/2012 | Shiga et al. | ............. | 310/156.53 |
| 2008/0185930 A1 * | 8/2008 | Ahrens et al. | ............ | 310/156.08 |
| 2008/0197736 A1 * | 8/2008 | Himmelmann et al. | . | 310/156.08 |
| 2008/0197737 A1 * | 8/2008 | Poulin et al. | .............. | 310/156.08 |
| 2008/0238232 A1 * | 10/2008 | Bando et al. | ................... | 310/126 |
| 2009/0261677 A1 * | 10/2009 | Ishikawa et al. | .......... | 310/156.12 |
| 2011/0175480 A1 * | 7/2011 | Booth et al. | ............. | 310/156.13 |
| 2011/0248592 A1 * | 10/2011 | Siegfriedsen | ............ | 310/156.08 |
| 2012/0286520 A1 * | 11/2012 | Booth | .............................. | 290/55 |
| 2013/0033142 A1 * | 2/2013 | Booth et al. | ............. | 310/156.12 |
| 2013/0200735 A1 * | 8/2013 | Lynch et al. | ..................... | 310/59 |

FOREIGN PATENT DOCUMENTS

| | | | |
|---|---|---|---|
| DE | 102008063045 A1 | 7/2010 | |
| EP | 2348619 A1 | 7/2011 | |

* cited by examiner

*Primary Examiner* — David Bryant
*Assistant Examiner* — Christopher M Koehler

(57) ABSTRACT

A magnet loading apparatus for loading magnet pole pieces onto a field of an electric machine is described. The apparatus includes positioning means realized to hold a magnet pole piece of a plurality P of magnet pole pieces in place relative to its designated position on the field; and a transfer means realized to simultaneously transfer a plurality P of magnet pole pieces from the positioning means onto the field of the electric machine. Also described is a method of loading magnet pole pieces onto a field of an electric machine.

20 Claims, 4 Drawing Sheets

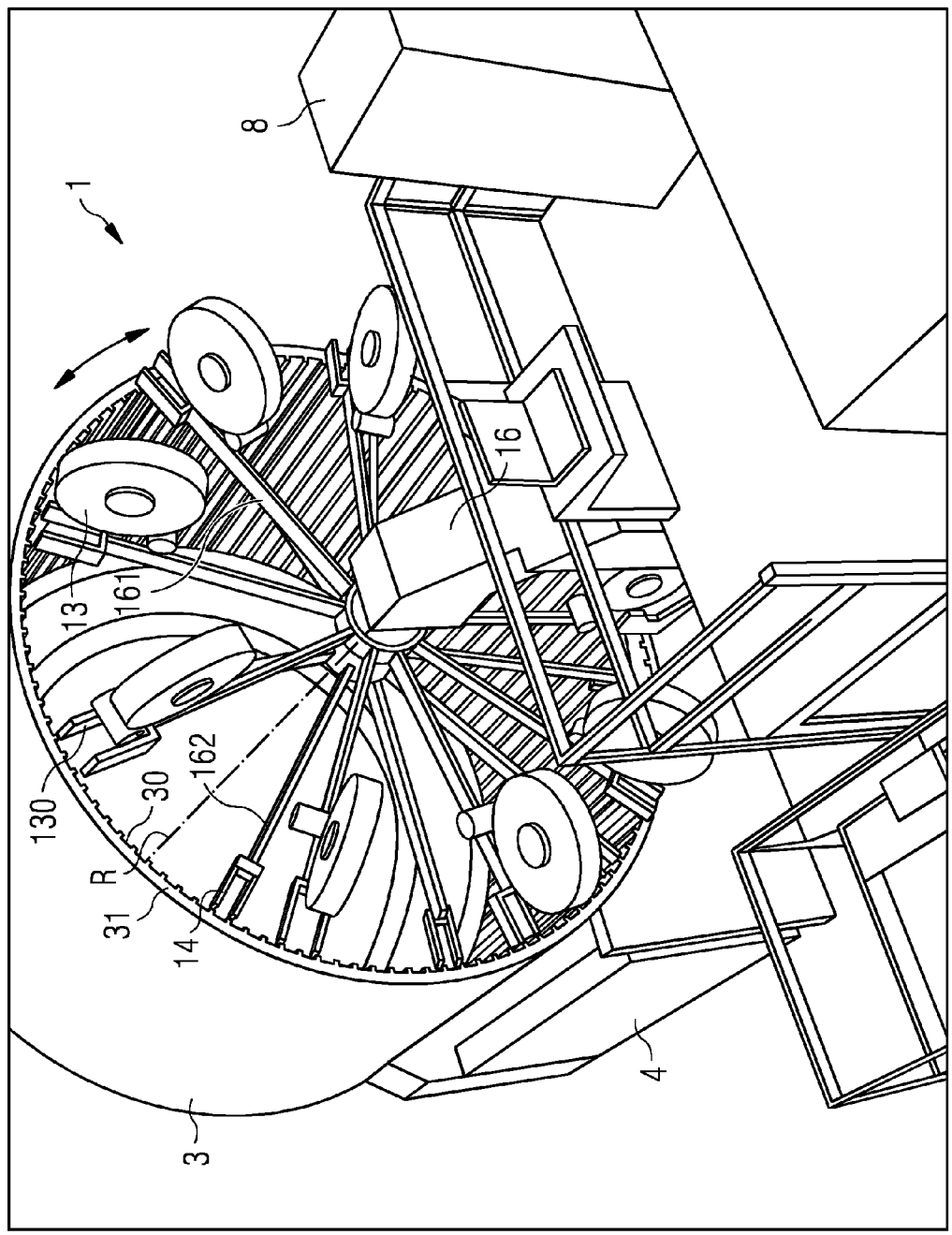

MAGNET LOADING APPARATUS

CROSS REFERENCE TO RELATED APPLICATIONS

This application claims priority of European Patent Office application No. 11176163.1 EP filed Aug. 1, 2011. All of the applications are incorporated by reference herein in their entirety.

FIELD OF INVENTION

The disclosure describes a magnet loading apparatus, and a method of loading magnets onto a field of an electric machine.

BACKGROUND OF INVENTION

Permanent magnets are often used in large electrical machines such as motors or generators. Such an electrical machine comprises two basic components, namely a field for creating magnetic flux, and an armature for generating electromotive force and for carrying current crossing the field. The armature usually comprises conductive coils wrapped on a stator, while the field usually comprises magnets arranged on a rotor. The rotor may surround the stator, or vice versa, and the magnets and coils face each other across a narrow air-gap. The established methods of loading or mounting permanent magnets onto the field of an electrical machine comprise various steps such as enclosing the individual permanent magnet poles in housings, gluing the permanent magnet poles to the field (usually the rotor), wrapping the entire arrangement in fiberglass bandage, or enclosing the arrangement in a vacuum bag, pumping resin into the bag and performing vacuum extraction to consolidate the permanent magnet poles to the rotor body.

SUMMARY OF INVENTION

These methods are accompanied by various problems such as the extensive and therefore costly effort involved in securing the permanent magnets to the field. Furthermore, permanent magnets are more brittle than conventional magnets on account of their material composition, since they usually contain a percentage of Dysprosium or other rare-earth element. Also, because the permanent magnet poles—which may be several meters in length and correspondingly heavy—are already magnetized before they are mounted onto the field, and therefore may be attracted to other permanent magnets of opposite polarity, they present a considerable safety hazard during the mounting procedure. For these reasons, handling of the permanent magnets requires special machinery and tools and very strict work-flow control to avoid potentially hazardous situations. An alternative approach, involving first loading the magnets onto the field and then magnetizing them, would avoid the hazardous manual handling but would be very costly and therefore impracticable to implement.

Another problem arises in case of a failure of a permanent magnet that is sealed in a fiberglass or resin envelope. Such a magnet must be removed and replaced, which is made difficult if the envelope must be opened and then resealed again, making it a complicated and costly procedure to replace a defective permanent magnet.

Another problem associated with permanent magnets arises specifically in the case of a large-diameter rotor. The overall weight of the rotor should be kept to a favorable minimum, which means the body thickness of the rotor must be kept relatively thin, resulting in poorer structural stability and stiffness. The weight of the rotor itself in a stationary state—for instance prior to or during magnet loading—may lead to deformation of the rotor shape. Such a deformation may result in the rotor assuming an elliptical or oval shape and a correspondingly uneven air-gap. Another problem is given by the narrow air gap in the case that the armature or stator is already positioned in the interior of the rotor body before this is loaded with the permanent magnets.

For the above-mentioned reasons, the prior art methods of mounting permanent magnets to a field of an electrical machine are hazardous, costly, and difficult to carry out.

Therefore an improved way of loading magnets onto the field of an electric machine, avoiding the problems described above is disclosed.

A magnet loading apparatus for loading magnet pole pieces onto a field of an electric machine comprises a positioning means realized to hold a magnet pole piece of a plurality P of magnet pole pieces in place relative to its designated position on the field; and a transfer means realized to simultaneously transfer the plurality P of magnet pole pieces from the positioning means onto the field of the electric machine.

Because the plurality P of magnet pole pieces is transferred onto the rotor in one step, this transfer may be balanced via the magnet loading apparatus. In other words, the magnetic forces exerted by the permanent magnets are evenly distributed so that an imbalance is avoided. Furthermore, the weight of the magnet pole pieces being inserted onto the field and of those already loaded onto the field is also evenly distributed. This balanced transfer or loading means that the field is not subject to uneven forces that could distort its shape. This results in a favorable minimization of structural stress on the field. The magnet loading apparatus may be therefore particularly suited to loading many magnet poles onto a large rotor, which, using the prior art techniques of magnet loading, would be subject to deformation on account of the unevenly distributed weight of the magnets as they are mounted, and also on account of the very strong magnetic forces exerted by any temporarily uneven distribution of the permanent magnets during the mounting procedure.

A method of loading magnet pole pieces onto a field of an electric machine comprises the steps of placing each magnet pole piece of a plurality P of magnet pole pieces on a positioning means such that a magnet pole piece is held in place relative to its designated position on the field of the electric machine, and simultaneously transferring the plurality P of magnet pole pieces from the positioning means onto the field of the electric machine.

An advantage of the method may be that the positioning means and the transfer means do not require hazardous manual interaction, so that workplace safety is favorably increased. Furthermore, the balanced loading method may be carried out in a more reliable, faster and more efficient manner than the prior art manual loading methods.

The magnet loading apparatus and/or the method of loading magnet pole pieces onto a field of an electric machine is particularly suited for loading the field of a wind turbine generator with magnet pole pieces comprising permanent magnets. To this end, the magnet loading apparatus is preferably dimensioned to load magnet pole pieces onto the field of a generator of a wind turbine.

Features of different claim categories may be combined as appropriate to give further embodiments not described herein.

As indicated above, the field of an electric machine may be stationary or it may rotate. However, particularly in electrical generators, the coils are arranged on a stator, and the magnets are arranged on a rotor. Therefore, without restricting the embodiments in any way, the terms "rotor" and "field" may be used interchangeably in the following. The rotor may be arranged in the interior of the stator, or vice versa, so that the magnets are separated from the coils by a narrow air gap. For simplicity, in the following the terms "magnet pole pieces" or "magnet poles" may be referred to simply as "pole pieces" or "poles" respectively. Also, the letter "P" is used consistently herein to indicate a certain integer number representing a plurality of pole pieces, a corresponding plurality of rotor slots, a corresponding plurality of apparatus components, etc.

In a first embodiment of the magnet loading apparatus, the positioning means comprises a distribution ring that may be arranged at a perimeter of the rotor. The distribution ring may be realized to accommodate the plurality of pole pieces so that these may be held in readiness for being transferred onto the rotor. The diameter of the distribution ring may be based on a diameter of the rotor, so that, for the case of an electrical machine in which the rotor is arranged outside the stator, an interior diameter of the distribution ring corresponds to an interior diameter of the rotor. In this way, the pole pieces may be held in position corresponding to an extension of their final position on the rotor. The distribution ring may be fixed or rotatable relative to the rotor, as will be explained below.

In a second embodiment of the magnet loading apparatus, the positioning means comprises a plurality of positioning heads connected to a hub arranged at a longitudinal axis of the field. Each positioning head may accommodate a magnet pole piece and may bring this into position in readiness for being transferred to its designated position on the rotor.

The positioning means could be arranged at a distance from the rotor while pole pieces are being inserted onto the positioning means. In this way, undesirable magnetic attraction between pole pieces being placed onto the positioning means and those already loaded on the rotor may be avoided. The pole pieces could be manually placed on the positioning means. However, in another embodiment, in each of the embodiments described above, the magnet loading apparatus may comprise a feeding arrangement realized to feed a magnet pole piece into the positioning means. Therefore, since the pole pieces may be automatically placed on the positioning means, this may be arranged favorably close to the rotor. For example, the feeding arrangement may comprise a conveyor belt to transport magnetic pole pieces to a point close to the positioning means, and a feeder to move a magnet pole piece from the conveyor belt into the positioning means.

In the first and second embodiments described above, the positioning means may be rotatable about an axis of rotation of the rotor. Since the rotor is essentially cylindrical, its axis of rotation comprises a longitudinal axis along the geometrical centre of the rotor. For example, a distribution ring may be arranged to rotate about this axis. Alternatively, the hub of a positioning means comprising positioning heads may be realized to rotate so that the positioning heads follow the essentially circular shape of the rotor. To this end, the positioning means may be mounted on a hub arranged or centered on a point on an axis of rotation of the rotor, and may be connected to the hub by any suitable means, for example a number of spokes or arms.

As mentioned in the introduction, a large rotor manufactured using a minimum of material may be relatively thin and flexible and may therefore be susceptible to some deformation before it is completely loaded with magnets and before it is finally secured in a housing. Therefore, in a further embodiment, the magnet loading apparatus may comprise an adjusting means for spatially adjusting the position of the positioning means relative to the rotor. For example, a positioning head may be realized to have several degrees of freedom relative to a spoke or arm connecting it to the hub. A distribution ring might comprise a number of individually controllable ring segments that may be moved radially relative to the rotor in order to compensate for tolerances in the design of the positioning means or of the rotor. A number of motors or servos may be used to adjust or fine-tune the position of the positioning means relative to the rotor before the transfer step is carried out. Any such motor or servo may be controlled on the basis of an input signal providing current information regarding the position of the positioning means relative to a slot of the rotor. For example, a laser could be used to measure a distance between the positioning means and the rotor, and/or a camera may be used to determine whether a positioning slot is in line with a rotor slot.

In another embodiment, the positioning means is realized to hold the plurality P of magnet pole pieces such that the magnetic pole pieces are arranged essentially equidistantly to each other. In this way, the forces exerted by the plurality P of magnetic pole pieces are essentially evenly distributed even before loading them onto the rotor. For example, if the positioning means comprises a distribution ring, this may comprise holding slots evenly arranged about the distribution ring for holding a plurality P of pole pieces. The magnetic pole pieces may be held in the positioning means such that they may not slip out of place, for example when a magnetic force is exerted on a magnetic pole piece (being brought into place by the positioning means) as it passes by magnetic pole pieces previously loaded onto the rotor. Therefore, in a further embodiment, a cross-sectional shape of the holding slot matches a cross-sectional shape of a corresponding rotor slot. For example, a magnetic pole piece may comprise a magnet bonded to a slightly wider base plate, so that the magnetic pole piece has an essentially T-shaped cross-section. The rotor slot in that case would have a corresponding cross-section, and the holding slot may comprise essentially the same cross-section. Of course, any suitable cross-sectional shape may be chosen in the design of the magnetic pole pieces, the rotor slots, and the holding slots.

Once the magnetic pole pieces are all in place in a distribution ring or in the positioning heads, the transfer step may be performed. If the magnetic pole pieces are pushed onto the rotor at varying speeds or to various lengths, an unequal distribution of forces may result in an undesirable deformation of the rotor. To this end, the transfer means of the magnet loading apparatus may be realized to transfer the plurality P of magnet pole pieces from the positioning means to the rotor such that the magnet pole pieces are arranged at essentially equal depths into the rotor, for example at the same distance from a first outer edge or rim of the rotor. The transfer means may be realized in a number of ways. For example, a plurality of pushing means and/or sliding means may be realized to synchronously push and/or slide the pole pieces out of a distribution ring or out of the positioning heads and onto the rotor. Thereby, the pushing/sliding means may be actuated evenly so that the pole pieces are moved at equal rates and by equal distances into the rotor. The pushing/sliding means may be realized to move a pole piece from a holding slot into a rotor slot.

A rotor of a large electric machine may be loaded with many magnets, or magnetic poles. For example, a machine might comprise 108 magnet poles, 54 each with a specific orientation (e.g. "north pole up" or "south pole up"), arranged alternately about the rotor. To avoid undesirable movements of the magnetic pole pieces while placing these on or in the positioning means and while bringing them into position relative to the rotor, it may be desirable that the magnet pole pieces of the plurality P of magnet pole pieces placed on the positioning means comprise a common orientation, either all "north pole up" or all "south pole up".

For such a large number of poles, various loading strategies might be applicable. For example, 54 magnetic pole pieces with a first orientation might be loaded simultaneously. However, a magnet loading apparatus designed to handle 54 magnetic pole pieces would evidently be impracticable. Therefore, in an embodiment, the plurality P of magnet pole pieces held in place on the positioning means comprises a factor or divisor of the total number N of magnet poles to be loaded onto the field. For example, for the case of 108 poles, the positioning means could be designed to handle six, nine, or eighteen magnetic pole pieces, since 54 is evenly divisible by these integers. Here and in the following, the letter "P" is used to refer to such a factor or divisor, and it may be assumed that this plurality P applies to the number of magnet pole pieces that are simultaneously inserted into the rotor, as well as the number of certain features of the magnet loading apparatus, as will become clear in the diagrams.

In the method disclosed, the steps may be carried out in an optimized manner. For example, the steps of placing the plurality P of magnet pole pieces onto the positioning means and transferring that plurality P to the field may be carried out repeatedly to load a plurality P of magnet poles on the field, where a magnet pole may comprise several magnet pole pieces, of the same magnetic orientation, arranged in line in a rotor slot. For example, if each pole comprises seven magnetic pole pieces of the same orientation, and the positioning means is realized to handle nine magnetic pole pieces, then nine "first" pole pieces are simultaneously loaded into nine evenly spaced rotor slots, then nine "second" pole pieces are inserted into those nine slots, etc., until nine "seventh" pole pieces are loaded, at which point these nine poles are complete. The process may be repeated for another set of nine poles, etc., until the total number of poles has been loaded onto the rotor.

Once all pole pieces of a pole have been loaded onto the rotor, these should be firmly held in place in their rotor slot so that they may not be pulled out of place by a pole piece of an opposite magnetic orientation being loaded onto the rotor. Therefore, in an embodiment, the method comprises a step of step of securing the pole pieces of a rotor slot, for example by inserting a terminating or securing element into the rotor slot of a completed pole. For example, a magnet lock may be inserted into each rotor slot of P completed poles. The positioning means may be realized to handle such a magnet lock. To this end, the magnet lock may essentially comprise the same cross-section as a magnetic pole piece, perhaps also the same length and the same general shape, and may have an additional securing function to prevent the magnetic pole pieces from slipping lengthways along the rotor slot.

The rotor slots could be filled in a number of ways. For example, a plurality P of poles of a first orientation could be loaded into a first set of rotor slots, then a plurality P of poles of the opposite orientation could be loaded into rotor slots adjacent to the first set, then a next plurality P of poles of the first orientation, etc. However, this might involve too many undesirable forces acting on the magnets and on the rotor. Furthermore, part of the assembly line, for example a feeding machine, may have to be re-adjusted or reconfigured each time when switching between poles. Therefore, in a further embodiment, the step of loading a plurality P of magnet poles on the field may be carried out repeatedly for the same orientation (e.g. "north pole up") until all poles of this orientation (54 using the previous example of a total of 108 poles) have been loaded, at which point the procedure may be repeated for the poles of the opposite orientation. In this way, relevant parts of the assembly line such as the feeding machine need only be re-adjusted or re-configured once, since the magnetic orientation is only changed once during the loading procedure.

Before commencing the loading procedure, the rotor may be stabilized or strengthened, for example by connecting a stabilizing ring or frame onto the rotor as a temporary measure, so that an essentially circular rotor shape may be maintained during the loading procedure. Alternatively or in addition, the rotor may be stabilized by inserting spacers between the rotor and the stator, for example at a number of points between the rotor slots.

For wind turbines with very long blades, the maximum rotational speed is limited. In a direct-drive turbine, this means that the rotational speed of the rotor is limited accordingly. Therefore, to generate high levels of power, a large number of magnet poles is required, and the rotor diameter should be as large as possible. The magnet loading procedure described herein is particularly suited to loading permanent magnets onto a large, relatively 'thin' and therefore flexible rotor of a direct-drive generator of a wind turbine with a capacity of several megawatts, for which the rotor is arranged around the stator.

BRIEF DESCRIPTION OF THE DRAWINGS

Other objects and features will become apparent from the following detailed descriptions considered in conjunction with the accompanying drawings. It is to be understood, however, that the drawings are designed solely for the purposes of illustration and not as a definition of the claims.

FIG. 5 shows a magnet loading apparatus according to a second embodiment.

DETAILED DESCRIPTION OF THE DRAWINGS

In the diagrams, like numbers refer to like objects throughout. Objects in the diagrams are not necessarily drawn to scale.

Figure 1:
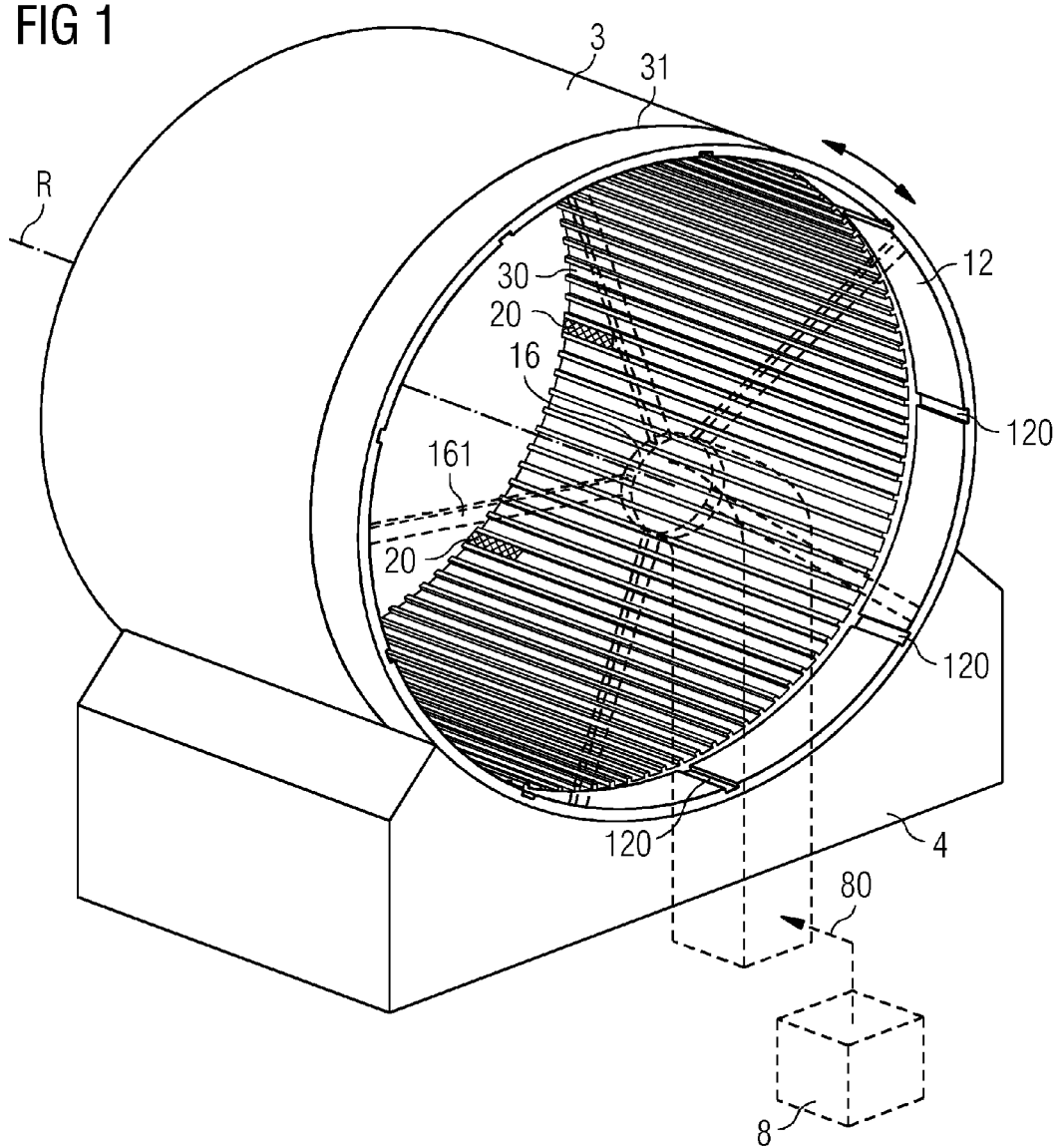
FIG. 1 shows a magnet loading apparatus according to a first embodiment.

FIG. 1 shows a magnet loading apparatus 1 according to a first embodiment. Here, a rotor 3 is to be filled with magnet poles, each comprising several magnet pole pieces that may be slid into appropriately shaped slots 30 in the rotor 3. The rotor 3, which may have a diameter well over 5 meters when intended for use in a wind turbine, is relatively thin and therefore prone to deformation using the prior art filling techniques explained in the introduction. The empty rotor 3 is arranged on a transport jig 4, which could be realized as a carriage to move on tracks of an assembly line, and which may serve as a structural support to maintain the circular shape of the rotor 3.

The magnet loading apparatus 1 according to this embodiment operates as follows: A distribution ring 12 is arranged adjacent to an outer rim 31 or perimeter 31 of the rotor 3. The distribution ring 12 is supported by spokes 161 connected to a hub 16 (indicated for clarity by the broken lines), and may be rotated as indicated by the arrows. An insertion arrangement may comprise a feeder realized to lift a magnet pole piece 20 from a conveyor and insert the magnet pole piece into a holding slot 120 of the distribution ring 12. Once a magnet pole piece 20 has been loaded into the distribution ring 12, this is caused to rotate so that an empty holding slot 120 is brought into position for the feeder. These steps are repeated until the distribution ring 12 is loaded with a plurality P of magnet pole pieces 20. Then, in a transfer step, the plurality P of magnet pole pieces 20 is moved or pushed simultaneously from the distribution ring 12 onto the rotor 3. In this way, the forces exerted between magnetic elements in the partially loaded rotor 3 are evenly distributed. To this end, a slider arrangement may be used, for example comprising a plurality of sliders attached by slider arms to the hub 16 such that the arms may be synchronously actuated. Such an arrangement may be referred to as a "slider wheel" and will be indicated in FIGS. 4 and 5 below. Here, a slider wheel may be actuated independently of the distribution ring 12. After transferring the plurality P of magnetic pole pieces 20 onto the rotor 3, these are equidistantly and evenly arranged about the rotor 3. The entire loading procedure may be controlled remotely, so that no manual manipulation of the heavy and potentially dangerous pole pieces 20 is necessary. For example, a control unit 8 (indicated here schematically) may issue appropriately timed control signals 80 to the hub 16 to cause it to carry out partial rotation each time the feeder has loaded a pole piece 20 onto the distribution ring 12. Once the ring 12 is filled with pole pieces 20, the control unit 8 may issue a command to the slider arrangement, causing it to synchronously move all pole pieces 20 onto the rotor 3.

Figure 2:
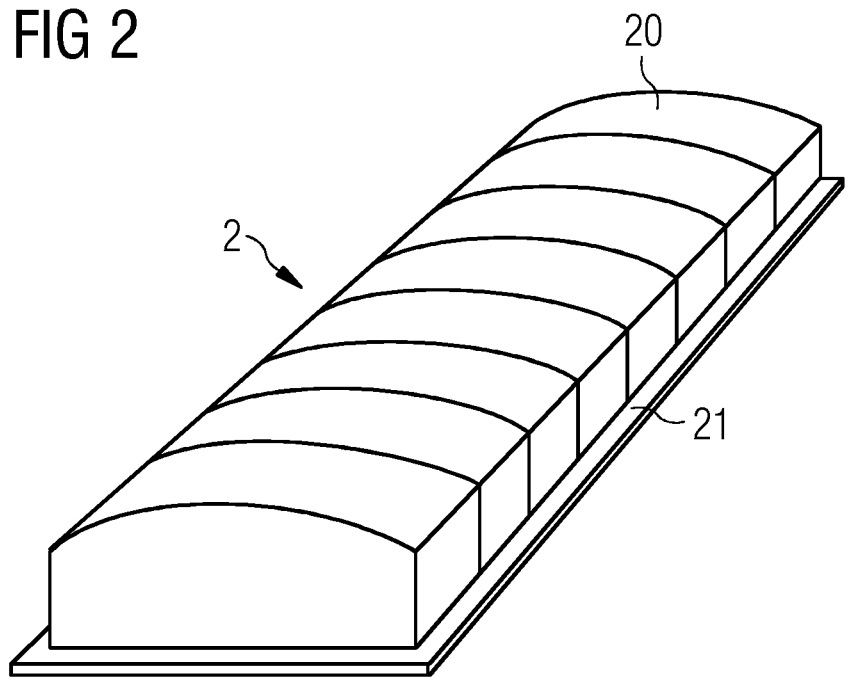
FIG. 2 shows a magnet pole for loading onto a rotor of a generator of a wind turbine.
Figure 3:
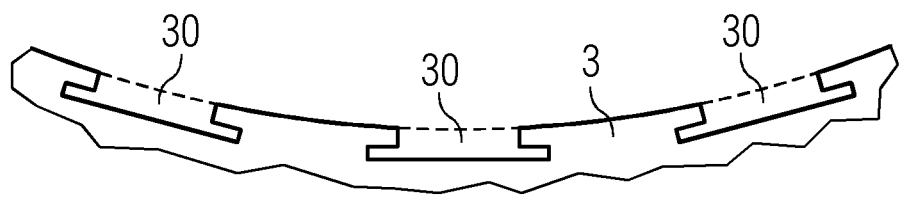
FIG. 3 shows a partial cross-section of the rotor of FIG. 2.

FIG. 2 shows a magnet pole 2 for loading onto a rotor of a generator of a wind turbine. The magnet pole 2 comprises a number of separate magnet pole pieces 20. The magnetic pole pieces 20 are generally all the same size. Each magnetic pole piece 20 comprises a permanent magnet glued or bonded in some suitable manner to a base plate 21, usually of steel. The base plate 21 is wider than the magnet, so that the pole piece 20 may be held in a suitably shaped slot of the rotor. This means that the magnet poles do not need to be attached to the rotor using fasteners, which may be time-consuming and dangerous because of the strong forces involved. FIG. 3 shows a partial cross-section of a rotor 3. The rotor 3 comprises a number of rotor slots 30, shaped to accommodate the magnetic pole pieces 20 of FIG. 2. Such rotor slots 30 usually extend along the length of the rotor 3, and may be closed at only one end, or open at both ends. Of course, a pole piece 20 could have any suitable cross-section, and the cross-section of a rotor slot 30 may be shaped or milled accordingly.

Figure 4:
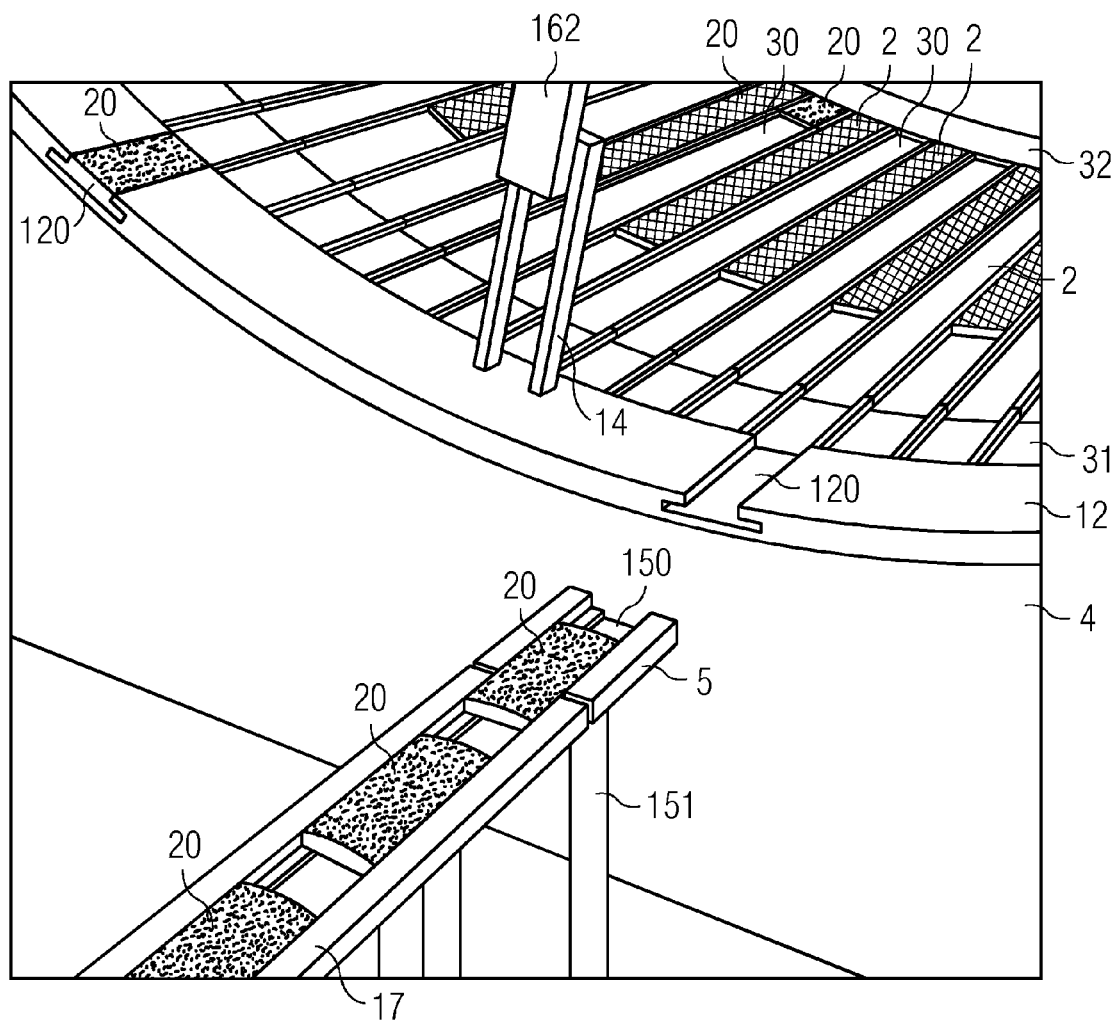
FIG. 4 shows a detail of the magnet loading apparatus of FIG. 1.

FIG. 4 shows a detail of the magnet loading apparatus 1 of FIG. 1, with the distribution ring 12 arranged adjacent to the rotor 3. The diagram shows a partially loaded rotor 3. Magnet pole pieces 20 of a first magnetic orientation (indicated by cross-hatching) have already been loaded into alternate rotor slots 30. Now, the magnet pole pieces of the opposite orientation (indicated by stippling) are being loaded. The diagram shows such a pole piece 20 at the end of a rotor slot 30. The diagram also indicates other possible elements of the assembly line. Here, a conveyor 17 transports pole pieces 20 to the distribution ring 12. A feeder 5 comprising a holding slot 150 atop a horizontally and/or vertically moveable column 151 is fed with a pole piece 20 from the conveyor 17. A slider 14, connected by a slider arm 162 to the hub (not shown) transfers the pole piece 20 from the feeder 5 into a holding slot 120 of the distribution ring 12. Here, the conveyor 17 and feeder 5 are shown for the sake of clarity at some distance from the ring 12. Of course, the feeder 5 could be positioned directly in front of the ring 12 so that a magnet pole piece 20 is not at risk of falling down. The distribution ring 12 may then be rotated by the amount necessary to bring the next empty holding slot 120 into place in front of the feeder 5. Here, the holding slots 120 of the distribution ring 12 are shown to have a T-shaped cross-section. When the holding slots 120 of the distribution ring 12 have been filled with the plurality P of pole pieces 20, the slider wheel may be brought into position and the sliders 14 may be simultaneously actuated to push or slide the pole pieces 20 into the rotor slots 30. The sliders need only be moved by an amount sufficient to push the magnet pole pieces into the rotor slots 30. However, the sliders may also be actuated to move them further along the rotor slots 30, as shown here, so that the pole pieces 20 are pushed as far as possible towards the other end 32 of the rotor 3.

FIG. 5 shows a magnet loading apparatus 1 according to a second embodiment. The principle of operation here is different. Instead of a distribution ring 12, the magnet loading apparatus 1 comprises a plurality P of positioning heads 13 which are connected via spokes 161 to the hub 16. This spoked arrangement of P positioning heads 13 may be referred to as a "placement wheel", and may rotate as indicated by the arrows. Again, the plurality P is a divisor of the total number N of magnet poles to be loaded onto the rotor 3. Each positioning head 13 serves to lift a magnet pole piece 20 from the feeder (not shown here). Once a magnet pole piece 20 has been taken from the feeder 5, the positioning wheel is rotated to allow the next positioning head 13 to grab a magnet pole piece 20. These steps are repeated until P magnet pole pieces 20 are in place in the positioning heads 13. Then, in a transfer step, the magnet pole pieces 20 are transferred from the positioning heads 13 into the rotor slots 30 of the rotor 3. To this end, each positioning head 13 may comprise an ejector or pushing element to push its magnet pole piece 20 into its designated rotor slot 30. The ejectors of the positioning heads may be controlled synchronously so that magnetic forces and weight of the pole pieces are evenly distributed during the transfer step. This embodiment of the magnet loading apparatus 1 could also comprise a slider arrangement 14, 162 as described above, for sliding the magnet pole pieces 20 further along the rotor slots 30, as shown here. Alternatively to the ejectors, such a sliding arrangement could also be realized to move the pole pieces 20 from the positioning heads 13 and into the rotor slots 30. As described in FIG. 1 above, a control unit 8 may issue appropriately timed control signals to the conveyer, the feeder, the hub 16, the positioning heads 13, the ejectors, and a sliding arrangement 14, 162 such that these act in a choreographed manner to carry out the loading procedure.

DETAILED DESCRIPTION OF INVENTION

A technician may monitor the loading procedure from a safe distance and may interact with the control unit 8 as appropriate.

In the two embodiments of the magnet loading apparatus 1 described above, the various components—distribution ring, positioning wheel, feeder, ejector, slider wheel, etc. are all remotely controlled. Therefore, there is no need for any hazardous manual work, so that workplace safety may be significantly improved. Furthermore, since a plurality of magnet pole pieces may be simultaneously inserted into the rotor, considerable savings in time may be achieved in the assembly and loading of a series of rotors, for example for a large number of generators for a wind park.

Furthermore, a combination of the two embodiments above is conceivable, for example by using positioning heads to fill holding slots of a distribution ring, from which the pole pieces are moved by a slider arrangement into their respective rotor slots. Also, a distribution ring could be realized to accommodate more than the plurality P of pole pieces, so that the distribution ring may be loaded with, for example, a multiple of the plurality P, while only one plurality P of pole pieces is transferred simultaneously onto the rotor in a transfer step, and the transfer step is completed until the distribution ring is empty once more.

While specific embodiments have been described in detail, those with ordinary skill in the art will appreciate that various modifications and alternative to those details could be developed in light of the overall teachings of the disclosure. For example, elements described in association with different embodiments may be combined. Accordingly, the particular arrangements disclosed are meant to be illustrative only and should not be construed as limiting the scope of the claims or disclosure, which are to be given the full breadth of the appended claims, and any and all equivalents thereof. For example, instead of sliding the pole pieces in a horizontal direction into the rotor slots of a horizontal rotor, the rotor could be arranged vertically so that the pole pieces may be dropped into the vertical rotor slots.

For the sake of clarity, it is to be understood that the use of "a" or "an" throughout this application does not exclude a plurality, and "comprising" does not exclude other steps or elements. Any reference to a "unit", "element" or "module" does not preclude the use of multiple units, elements or modules.

The invention claimed is:

1. A magnet loading apparatus for loading magnet pole pieces onto a field of an electric machine, the apparatus comprising:
   a positioning means realized to hold a magnet pole piece of a plurality of magnet pole pieces in place relative to a designated position of the magnetic pole piece on the field; and
   a transfer means realized to simultaneously transfer a plurality of magnet pole pieces from the positioning means onto the field of the electric machine.

2. The magnet loading apparatus according to claim 1, wherein the positioning means comprises a distribution ring realized to be arranged adjacent to the field.

3. The magnet loading apparatus according to claim 1, wherein the positioning means comprises a plurality of positioning heads connected to a hub arranged at a longitudinal axis of the field.

4. The magnet loading apparatus according to claim 3, further comprising:
   an adjusting means for spatially adjusting the position of a positioning head relative to the field.

5. The magnet loading apparatus according to claim 1, wherein the positioning means is rotatable about a longitudinal axis of the field.

6. The magnet loading apparatus according to claim 1, further comprising:
   a feeding arrangement realized to feed a magnet pole piece into the positioning means.

7. The magnet loading apparatus according to claim 1, wherein the transfer means is realized to transfer the plurality of magnet pole pieces from the positioning means to the field such that the magnet pole pieces are arranged at essentially equal distances from a first outer edge of the field.

8. The magnet loading apparatus according to claim 1, wherein the positioning means comprises a holding slot for a magnet pole piece, wherein a cross-sectional shape of the holding slot matches a cross-sectional shape of a corresponding pole-piece slot of the field.

9. The magnet loading apparatus according to claim 1, wherein the positioning means is realized to hold the plurality P of magnet pole pieces such that the magnet pole pieces are arranged essentially equidistantly in the positioning means.

10. A method of loading a plurality of magnet pole pieces onto a field of an electric machine, comprising:
    placing each magnet pole piece of the plurality of magnet pole pieces on a positioning means such that each magnet pole piece is held in place relative to its designated position on the field of the electric machine; and
    simultaneously transferring the plurality of magnet pole pieces from the positioning means onto the field of the electric machine.

11. The method according to claim 10,
    wherein the plurality of magnet pole pieces held in place on the positioning means comprises
    a factor of the total number of magnet poles to be loaded onto the field.

12. The method according to claim 11,
    wherein the magnet pole pieces of the plurality of magnet pole pieces placed on the positioning means comprise a common magnetic orientation.

13. The method according to claim 11,
    wherein the placing the plurality of magnet pole pieces onto the positioning means and transferring that plurality to the field repeated in order to load a plurality of magnet poles on the field.

14. The method according to claim 11,
    wherein the loading the plurality of magnet poles on the field is repeated for all magnet poles of the common magnetic orientation.

15. The method according to claim 10,
    wherein the magnet pole pieces of the plurality of magnet pole pieces placed on the positioning means comprise a common magnetic orientation.

16. The method according to claim 15,
    wherein the placing the plurality of magnet pole pieces onto the positioning means and transferring that plurality to the field repeated in order to load a plurality of magnet poles on the field.

17. The method according to claim 15,
    wherein the loading the plurality of magnet poles on the field is repeated for all magnet poles of the common magnetic orientation.

18. The method according to claim 10,
    wherein the placing the plurality of magnet pole pieces onto the positioning means and transferring that plurality to the field repeated in order to load a plurality of magnet poles on the field.

19. The method according to claim 18,
    wherein the loading the plurality of magnet poles on the field is repeated for all magnet poles of the same magnetic orientation.

20. The method according to claim 10,
    wherein the loading the plurality of magnet poles on the field is repeated for all magnet poles of a common magnetic orientation.

* * * * *